April 9, 1940.  R. A. BAUDRY  2,196,408

EXPLOSION-RESISTING MOTOR

Filed April 21, 1938  2 Sheets—Sheet 1

WITNESSES:
Leon M. Garman
F. P. Lyl

INVENTOR
René A. Baudry.
BY
O. B. Buchanan
ATTORNEY

April 9, 1940. R. A. BAUDRY 2,196,408

EXPLOSION-RESISTING MOTOR

Filed April 21, 1938 2 Sheets-Sheet 2

WITNESSES:

INVENTOR
René A. Baudry.
BY O.B.Buchanan
ATTORNEY

Patented Apr. 9, 1940

2,196,408

UNITED STATES PATENT OFFICE 2,196,408

EXPLOSION-RESISTING MOTOR

René A. Baudry, Pittsburgh, Pa., assignor to Westinghouse Electric & Manufacturing Company, East Pittsburgh, Pa., a corporation of Pennsylvania Application April 21, 1938, Serial No. 203,323

4 Claims. (Cl. 171—252)

The present invention relates to explosion-resisting or other totally enclosed motors and, more particularly, to an improved frame construction and arrangement of coolers for such motors.

Explosion-resisting motors are intended for use in locations, such as mines, where there may be considerable amounts of inflammable gases in the air, which may get into the interior of the motor and be ignited, causing explosions. Such motors are, therefore, totally enclosed in an airtight housing, and are so arranged that in case of an explosion within the housing the flame cannot reach the outside of the motor and ignite the gas in the surrounding air. Since the motor is totally enclosed, it is necessary to provide some means for cooling the ventilating air which circulates inside the housing. This is usually done by blowing cool air through coolers consisting of groups of tubes which pass through the housing, and which are so arranged that the air inside the housing flows over them.

The object of the invention is to provide an improved frame construction for explosion-resisting motors of the type described above.

A further object is to provide an arrangement of coolers such that the air in the housing will flow through them in a substantially radial direction to provide more effective and more uniform cooling of the air.

Figure 1:
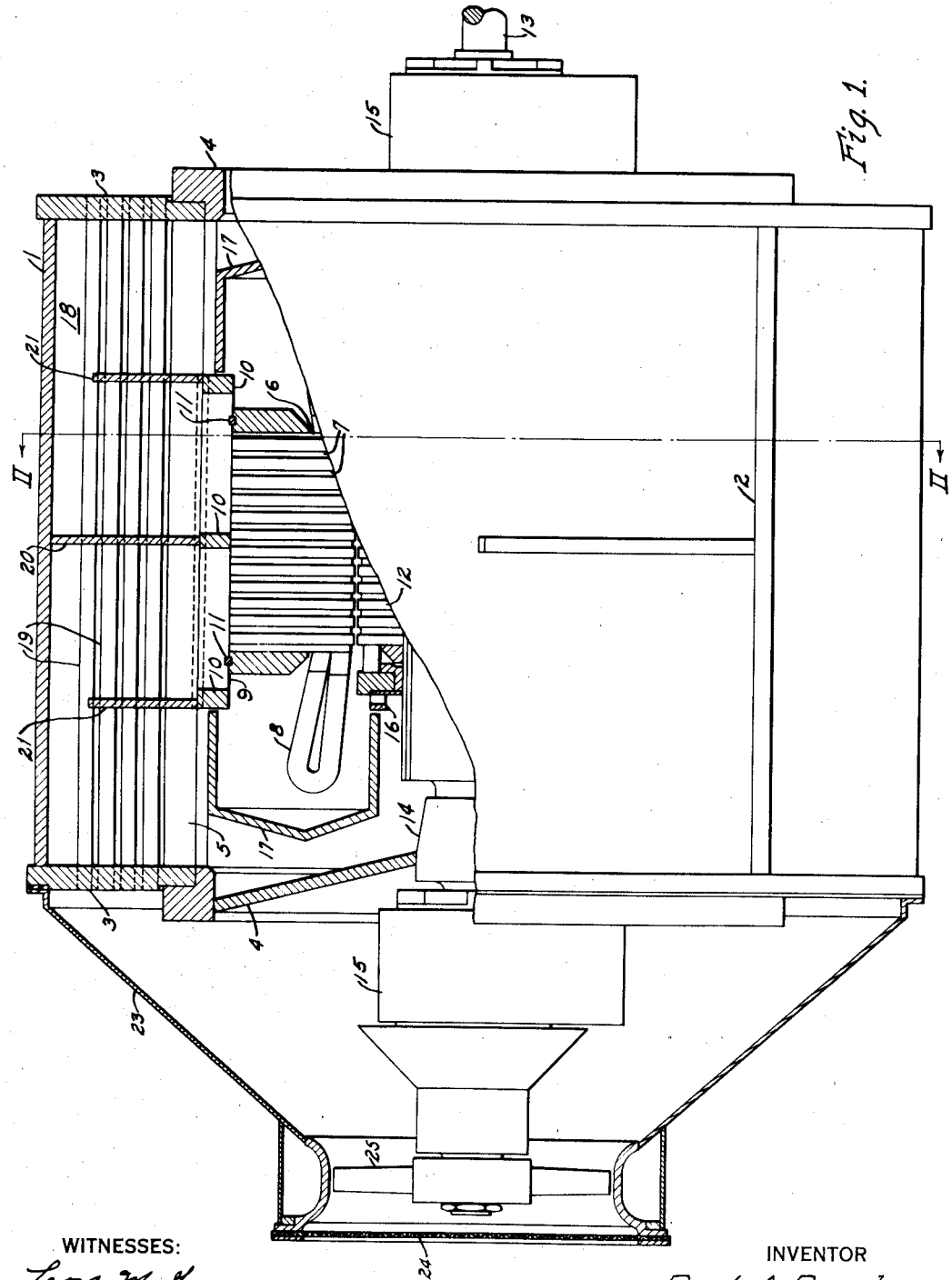
Figure 2:
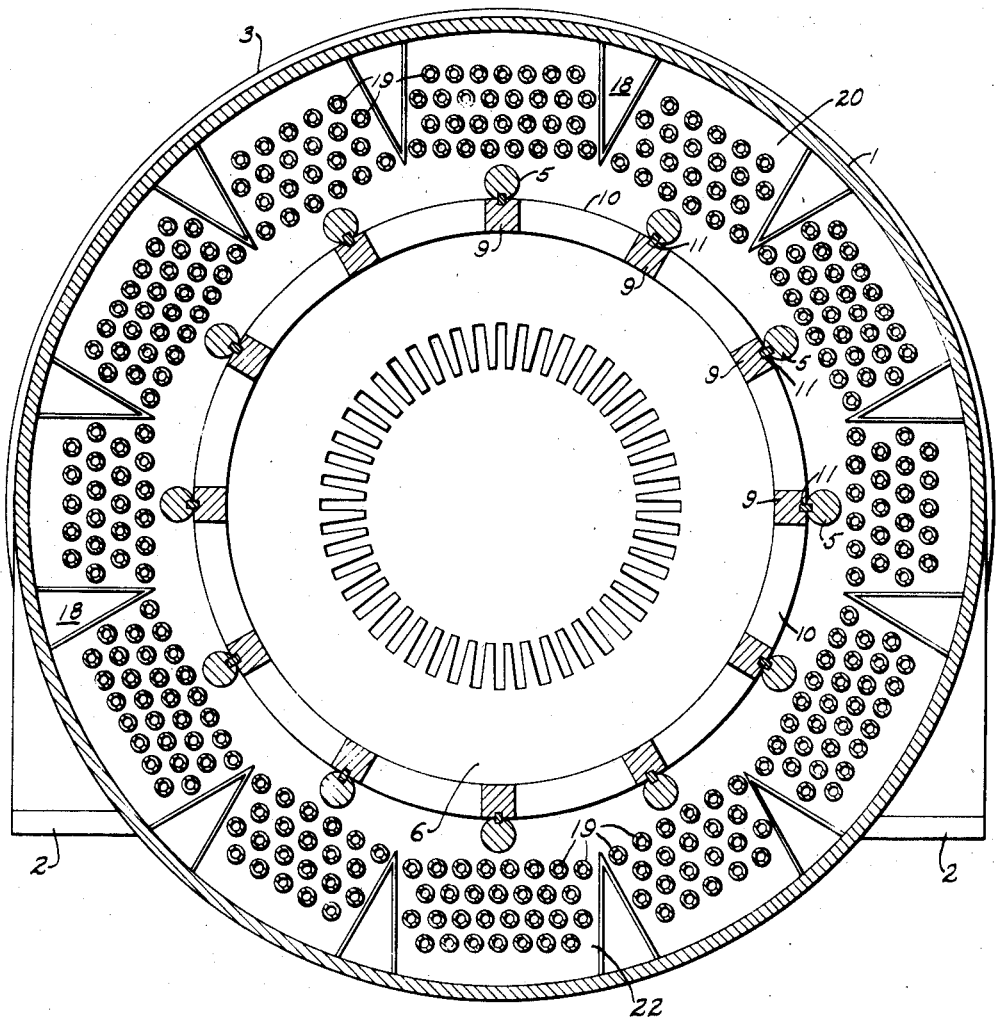

The invention will be more fully understood from the following detailed description taken in connection with the accompanying drawings, in which:

Figure 1 is a side elevation of a large explosion-resisting motor, partly in longitudinal section; and Fig. 2 is a transverse section through the motor approximately on the line II—II of Fig. 1, with the rotor omitted.

As shown in Fig. 1, the motor of the present invention has an outer, generally cylindrical housing 1 provided with foot supports 2. The housing is closed at each end by annular end rings 3, which are welded or otherwise secured to the housing 1 to form an air-tight joint, and by concave end bells 4 secured to the inner peripheries of the end rings 3. Within the housing, there is provided a plurality of longitudinal bars 5, which are welded at their ends to the inner peripheries of the end rings 3. The stator core 6 is supported on these bars and is built up of laminations arranged in spaced groups to form radial air ducts 7. Suitable windings 8 are disposed in slots in the stator core in the usual manner. Longitudinal ribs 9, corresponding in number to the bars 5, are secured on the outside of the stator core, and circumferential rings 10 extend around the core between the ribs to provide greater rigidity. The ribs 9 are made fast to the bars 5 by means of keys 11 or by welding, thus providing a solid and rigid support for the stator.

A rotor member 12 of any desired construction and carrying windings of any suitable type is secured to the shaft 13, which passes through glands 14 in the end bells, and is supported in bearings 15 mounted on the exterior of the end bells. Fan blades 16 are secured at each end of the rotor member to assist in circulating the air inside the housing, and inner end bells or baffle members 17 may be provided, if desired, to properly direct the flow of air.

In order to cool the air inside the housing, a plurality of coolers 18 is provided in the annular space between the stator core 6 and the housing 1. Each of these coolers consists of a plurality of tubes 19 arranged in a group and extending longitudinally between the end rings 3. The tubes pass entirely through the end rings and are preferably welded therein. An annular ring 20 through which the tubes pass is provided in the center of the housing and is welded to the housing and to the bars 5. Baffles 21, which are also in the form of annular rings, are placed intermediate the ring 20 and the end rings 3 to direct the heated air discharged from the stator core in a substantially radial direction through the coolers. As many coolers as necessary may be used, spaced equally around the circumference of the motor, and in most cases it will be preferable to use a large number of coolers placed close together, as shown in Fig. 2, so that they extend in a practically continuous group around the motor. The space between adjacent coolers is closed by sheet metal baffles 22 to insure that all of the air will flow radially through the coolers.

In order to provide a flow of cool air through the tubes of the coolers 18, an air housing 23 of generally conical shape is secured to the end ring 3 at one end of the machine. This housing has a large opening in its outer end which may, if desired, be covered by a screen 24. A fan 25, mounted on the end of the shaft 13, is positioned in this opening and serves to draw air into the housing 23 and blow it through the tubes 19.

In operation, the air inside the housing 1 is circulated by the fan blades 16 through the rotor member and stator windings and escapes through the air ducts 7 in the stator core. The air is discharged from the ducts 7 into the annular space between the bars 5 and the housing 1, in which the coolers are located. The ring 20 and baffles 21 and 22 direct the flow of air in a substantially radial direction through the coolers towards the housing 1, and then longitudinally along the inner surface of the housing towards the ends of the motor where it flows radially inward to be recirculated through the motor. The fan 25 supplies a steady stream of cool air, which is blown through the tubes 19 of the coolers, and escapes at the opposite end of the machine.

It will be obvious that the frame construction of the present invention, in which the stator core is supported directly on the bars 5, has many advantages over the type of frame construction previously used in motors of this kind in which the stator core was supported in an inner housing or frame member which was formed with openings to permit the air to escape into the outer housing. The present construction entirely eliminates the inner housing and is, therefore, simpler and less expensive to build. The substantially radial flow of the ventilating air also provides more effective cooling for the motor than was possible in the construction mentioned above, in which the air flowed in both radial and tangential directions, which resulted in lack of uniformity of cooling. With the radial flow of the present invention, the air is uniformly cooled in all parts of the machine and the ventilation is greatly improved.

It will be seen, therefore, that a frame construction and arrangement of coolers for an explosion-resisting motor has been provided, which greatly simplifies the motor construction and reduces its cost, and at the same time gives improved ventilation. It is to be understood that, although a specific embodiment of the invention has been shown and described, it is not limited to the exact details of construction shown, but in its broadest aspects it includes all equivalent modifications and embodiments which come within the scope of the appended claims.

I claim as my invention:

1. A totally enclosed dynamo-electric machine having a generally cylindrical housing, annular end rings at each end of the housing, a plurality of bars extending longitudinally of the housing and secured at their ends to the inner peripheries of the end rings, a stator member secured to the bars, a plurality of groups of tubes extending longitudinally between the end rings, said tubes having their ends secured in the end rings and extending through them to permit a cooling medium to flow through the tubes, and means for causing the air discharged from the stator member to flow radially through said groups of tubes into the space between the tubes and the housing.

2. A totally enclosed dynamo-electric machine having a generally cylindrical housing, annular end rings at each end of the housing, a plurality of longitudinal supporting members, a stator member secured to the supporting members, said supporting members being fastened at their ends to the inner peripheries of the end rings to provide an annular space between the stator member and the housing, a plurality of coolers in said space, each cooler comprising a group of tubes extending longitudinally between the end rings, means to force the air discharged from the stator member to flow over the tubes in a substantially radial direction, and means for preventing the air from flowing through the spaces between the coolers.

3. A totally enclosed dynamo-electric machine having a generally cylindrical housing, annular end rings at each end of the housing, a plurality of longitudinal supporting members, a stator member secured to the supporting members, said supporting members being fastened at their ends to the inner peripheries of the end rings to provide an annular space between the stator member and the housing, a plurality of coolers in said space, each cooler comprising a group of tubes extending longitudinally between the end rings, and baffles to force the air discharged from the stator member to flow through the coolers in a substantially radial direction and to prevent it from flowing in the spaces between the coolers.

4. A totally enclosed dynamo-electric machine having a generally cylindrical housing, annular end rings at each end of the housing, a plurality of longitudinal supporting members, a stator member secured to the supporting members, said supporting members being fastened at their ends to the inner peripheries of the end rings to provide an annular space between the stator member and the housing, a plurality of coolers in said space, each cooler comprising a group of tubes extending longitudinally between the end rings, transverse baffles to force the air discharged from the stator member to flow through the coolers in a substantially radial direction toward the housing, then in a longitudinal direction along the inner surface of the housing toward the ends of the machine and then radially inward to be recirculated through the stator member, and longitudinal baffles between the coolers to force all of the air to flow through the coolers.

RENÉ A. BAUDRY.